United States Patent [19]
Satran et al.

[11] Patent Number: 5,383,750
[45] Date of Patent: Jan. 24, 1995

[54] EXCHANGEABLE MILLING CUTTING INSERTS

[75] Inventors: Amir Satran, Kfar Havradim; Carol Smilovici, Acre, both of Israel

[73] Assignee: Iscar Ltd., Migdal Tefen, Israel

[21] Appl. No.: 65,826

[22] Filed: May 21, 1993

[30] Foreign Application Priority Data

May 25, 1992 [IL] Israel ..................................... 101985

[51] Int. Cl.⁶ .............................. B23L 5/20; B23L 5/10
[52] U.S. Cl. ..................................... 407/113; 407/114
[58] Field of Search ................. 407/33, 42, 56, 61, 407/62, 63, 113, 114

[56] References Cited

U.S. PATENT DOCUMENTS

| | | | |
|---|---|---|---|
| 1,019,564 | 3/1912 | Unterloff | 407/63 |
| 4,294,565 | 10/1981 | Erkfritz | 407/113 |
| 4,699,549 | 10/1987 | Shimomura et al. | 407/42 |
| 5,052,863 | 10/1991 | Satran | 407/113 |
| 5,071,291 | 12/1991 | Kaminski | 407/30 |
| 5,199,827 | 4/1993 | Pantzar | 407/42 |

FOREIGN PATENT DOCUMENTS

| | | | |
|---|---|---|---|
| 0502541A1 | 6/1992 | European Pat. Off. | |
| 7509836 | 3/1976 | Netherlands | 407/113 |

*Primary Examiner*—William E. Terrell
*Attorney, Agent, or Firm*—Pennie & Edmonds

[57] ABSTRACT

The invention relates to a milling cutter insert of substantially prismatic rhomboidal shape which comprises upper, base and side surfaces. The intersection of each side surface and the upper surface constitutes a cutting edge. Rake surfaces form part of the upper surface and are associated with the cutting edges. A first pair of adjacent cutting edges meets at a first common insert corner. A second pair of adjacent cutting edges meets at a second common insert corner diagonally located with respect to the first insert corner. The constituent cutting edges of each pair and their associated rake surfaces slope towards the base surface and their common corner.

6 Claims, 7 Drawing Sheets

5,383,750

EXCHANGEABLE MILLING CUTTING INSERTS

FIELD OF THE INVENTION

This invention relates to exchangeable, hard metal cutting inserts for use with a rotary milling cutter, comprising a substantially cylindrical holder in which are formed one or more peripheral recesses, in which recesses are respectively and releasably mounted a corresponding number of such inserts, the or each recess furthermore providing for a swarf space in front of each insert.

BACKGROUND OF THE INVENTION

Cutting inserts as used in milling cutter tools are generally of prismatic shape having upper, base and side surfaces with the intersection of each side surface—relief flank surface—of the upper surface of the insert constituting a cutting edge.

The insert is so held in the holder that its cutting edge is located in the circular cutting path of the tool and is generally inclined with reference to the rotary axis of the tool by an angle which is referred to as the axial rake angle. It is known for rotary milling cutters to have inserts wherein the cutting edges present positive axial rake angles or, alternatively, where they present negative axial rake angles. It is also known for one and the same cutter to be provided with inserts, some of which present positive axial rake angles whilst others present negative axial rake angles.

In general, the axial rake angle presented by the cutting edge of the insert is determined by the angle of the seating in the tool holder on which the insert is located. From this, it follows that a milling cutter tool having inserts whose cutting edges present positive axial rake angles, are formed with seatings which could not be used with inserts whose cutting edges present negative axial rake angles. It also follows that with milling cutter tools having inserts some of which present positive axial rake angles whilst others present negative axial rake angles, the cutter tool must be specially designed so that the seatings fulfil these requirements.

It has already been proposed (see our U.S. Pat. No. 5,052,863) to provide the milling cutter inserts with cutting edges which slope with respect to the plane of the insert base and in this way, the cutting edges of the insert present positive or negative axial rake angles whilst the insert seatings can be uniformly directed parallel to the rotational axis of the milling tool. With such inserts, one and the same cutting tool can be used with inserts whose cutting edges present positive axial rake angles, as with inserts whose cutting edges present negative axial rake angles.

Even, however, with such a modified insert, it is still necessary to fit the milling cutter tool with differing inserts depending on whether one wishes the cutting edge of the insert to present positive or negative axial rake angles, and this necessitates keeping available a relatively large stock of milling cutter inserts.

It is an object of the present invention to provide a new and improved milling cutter insert in which the above-referred-to disadvantages are substantially reduced or overcome.

BRIEF SUMMARY OF THE INVENTION

According to the present invention there is provided a milling cutter insert of substantially prismatic rhomboidal shape comprising upper, base and side surfaces with the intersection of each side surface and the upper surface constituting a cutting edge;

rake surfaces forming part of said upper surface and respectively associated with said cutting edges;

a first pair of adjacent cutting edges meeting at a first common insert corner, a second pair of adjacent cutting edges meeting at a second common insert corner diagonally located with respect to said first insert corner, and the constituent cutting edges of each pair and their associated rake surfaces sloping towards the base surface and their common corner.

Thus, with a milling cutter insert in accordance with the present invention, depending on the position in which the insert is located on its seating, the operational cutting edge can present, as required, either a positive or a negative axial rake angle. Thus, for example, if the insert is located on the seating so that the operational cutting edge presents a positive axial rake angle, all that is required so that the appropriate operational cutting edge should present a negative axial rake angle is to rotate the insert on its seating until the appropriate operational cutting edge is placed in position.

In this way, it will be readily appreciated that one and the same cutting insert can be used for either positive or negative axial rake angle milling operations. This clearly reduces the amount of separate cutting inserts which have to be retained in stock.

Furthermore, and in view of the fact that the cutting insert is of rhomboidal shape, then the insert is effectively provided with two pairs of cutting edges with the constituent cutting edges of each pair capable of presenting the positive or negative axial angles as required, whilst the other pair remain in reserve for use when the cutting edges of the first pair become worn.

BRIEF SUMMARY OF THE DRAWINGS

One embodiment of a milling cutter insert in accordance with the present invention will now be described by way of example and with reference to the accompanying drawings, in which.

DETAILED DESCRIPTION OF PREFERRED EMBODIMENT

Figure 1:
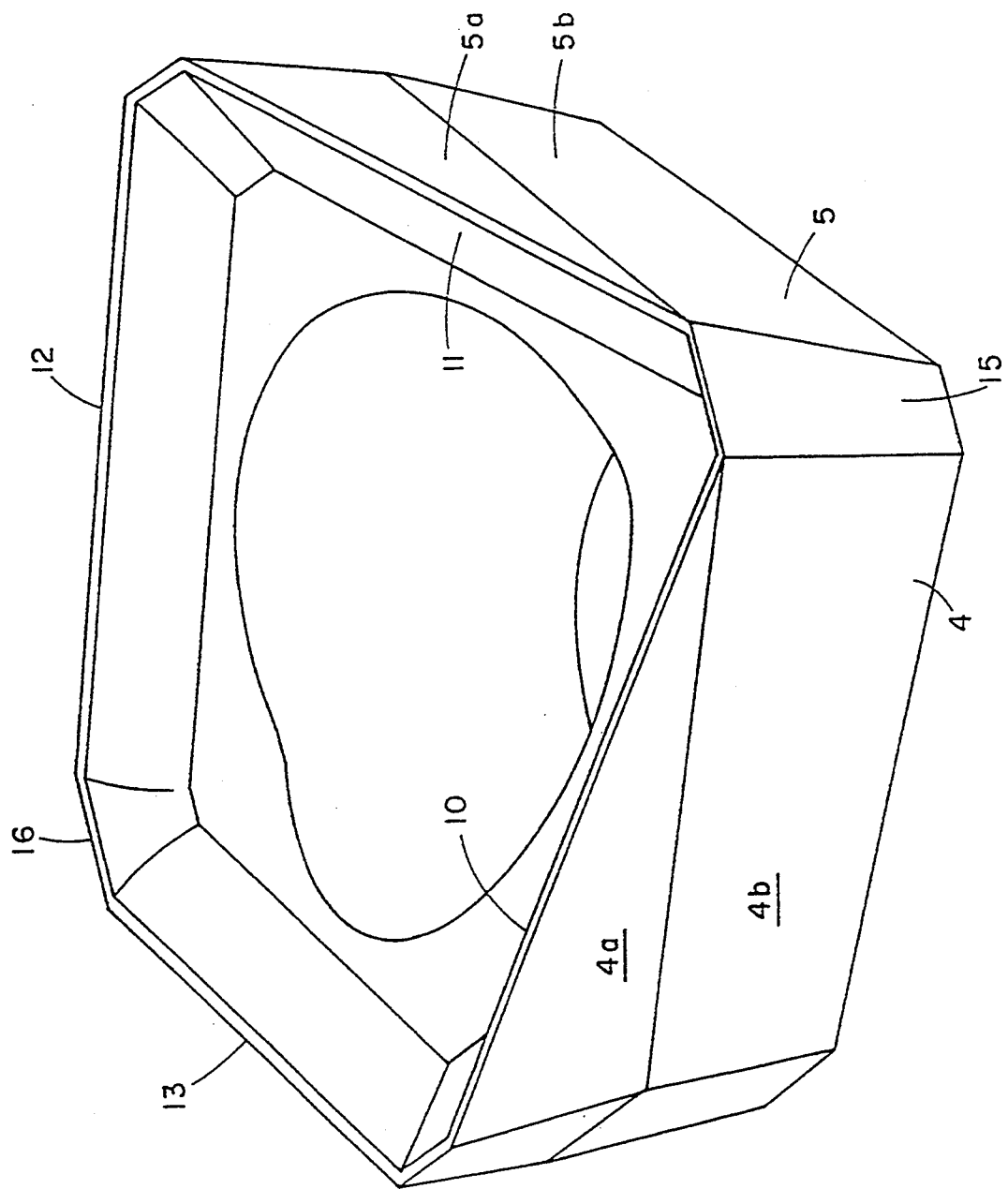
FIGS. 1, 2 and 3 are respectively differing perspective views of an insert in accordance with the present invention.
Figure 2:
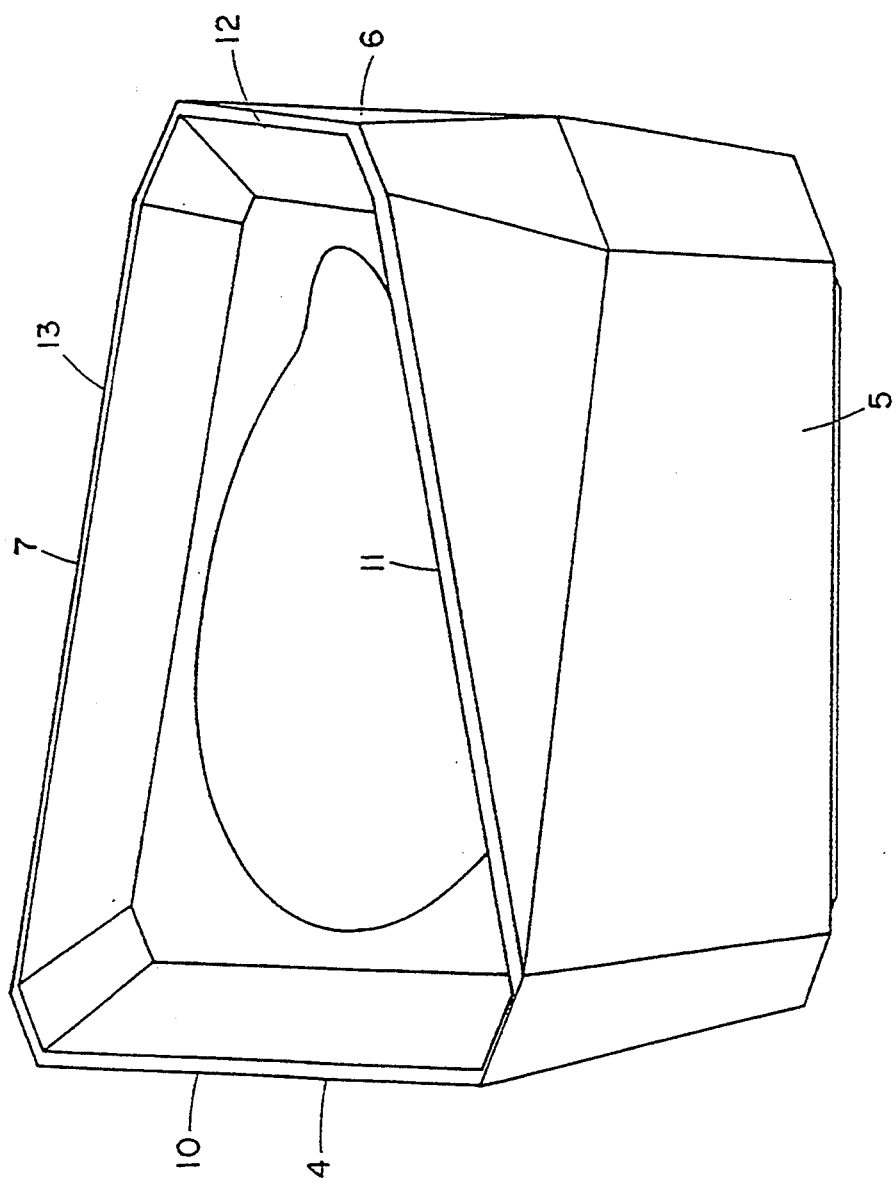
Figure 3:
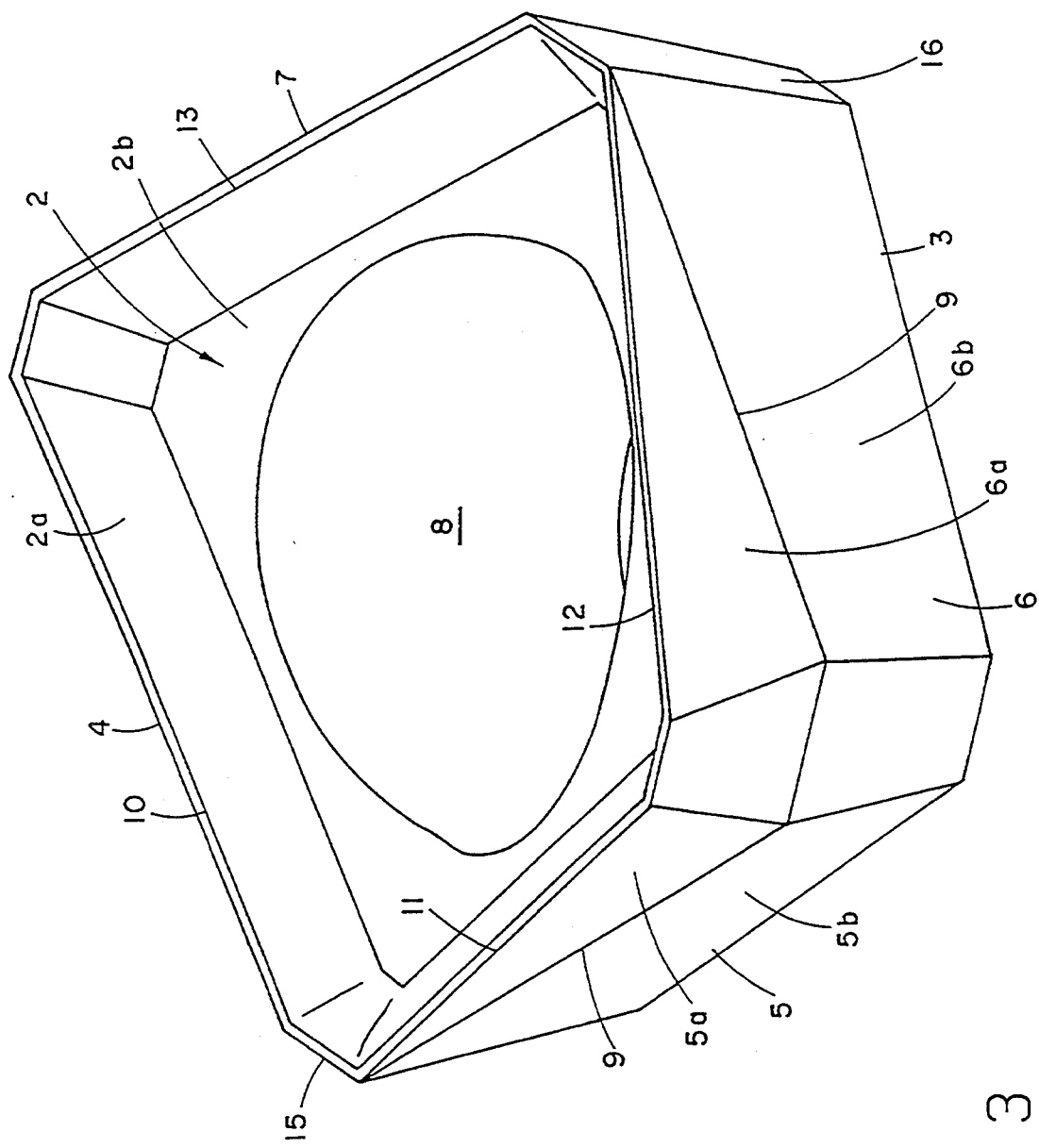

As seen in FIGS. 1, 2 and 3 of the drawings, a cutting insert 1 is of generally rhomboidal shape and is formed with upper and base surfaces 2 and 3 and side surfaces 4, 5 and 6 (the fourth side surface is not seen). The upper surface of the insert 2 comprises downwardly sloping rake surfaces 2a and a central, planar surface 2b. The insert is provided with a central locating bore 8.

The side surfaces 4, 5 and 6 are each divided by lines 9 into narrow, upper, continuously curved flank portions 4a, 5a, 6a and lower planar flank portions 4b, 5b and 6b.

The intersection of the upper flank portions 4a, 5a and 6a and the fourth, unseen flank portion with the respective rake surfaces 2a, define respective cutting edges 10, 11, 12 and 13.

As described in our earlier U.S. Pat. No. 5,052,863, the upper flank portions 4a, 5a and 6a and the upper flank portion of the fourth, unseen side surface, together with the rake surfaces 2a, are continuously curved such that the relief and radial rake angles along the lengths of the cutting edges 10, 11, 12 and 13 remain substantially invariant.

Furthermore, and as with the insert illustrated and described in the earlier U.S. patent specification, the cutting edges 10, 11, 12 and 13 are themselves curved, the curvature being such that each cutting edge forms part of the curved side of a plane which intersects a cylinder constituting a surface of revolution of a cutting edge at an angle corresponding to the axial rake angle of the insert in the milling cutter. For a full and detailed description of the mode of determination of this curvature of the cutting edge, as well as the curvature of the upper flank portions, reference is directed to the earlier patent specification.

As can be seen, the side surfaces 4 and 5 have a common corner 15, whilst the side surfaces 6 and 7 have a common corner 16.

The cutting edges 10 and 11 (constituting a first pair of adjacent cutting edges) and their associated rake surfaces 2a slope downwardly towards the base surface 3 and the common insert corner 15, whilst the cutting edges 12 and 13 (constituting a second pair of adjacent cutting edges) and their associated rake surfaces slope downwardly towards the base 3 and the common insert corner 16 which is diagonally located with respect to the corner 15. Thus, when the side surfaces 5 and 7 are viewed respectively end on, the cutting edges 10 and 11 are seen to slope in opposite senses. This is, of course, also the case with the associated rake surfaces 2a. Similarly, when the side surfaces 4 and 6 are viewed end on, the cutting edges 10 and 12 are seen to slope in opposite senses (as do the associated rake surfaces 2a).

Figure 4:
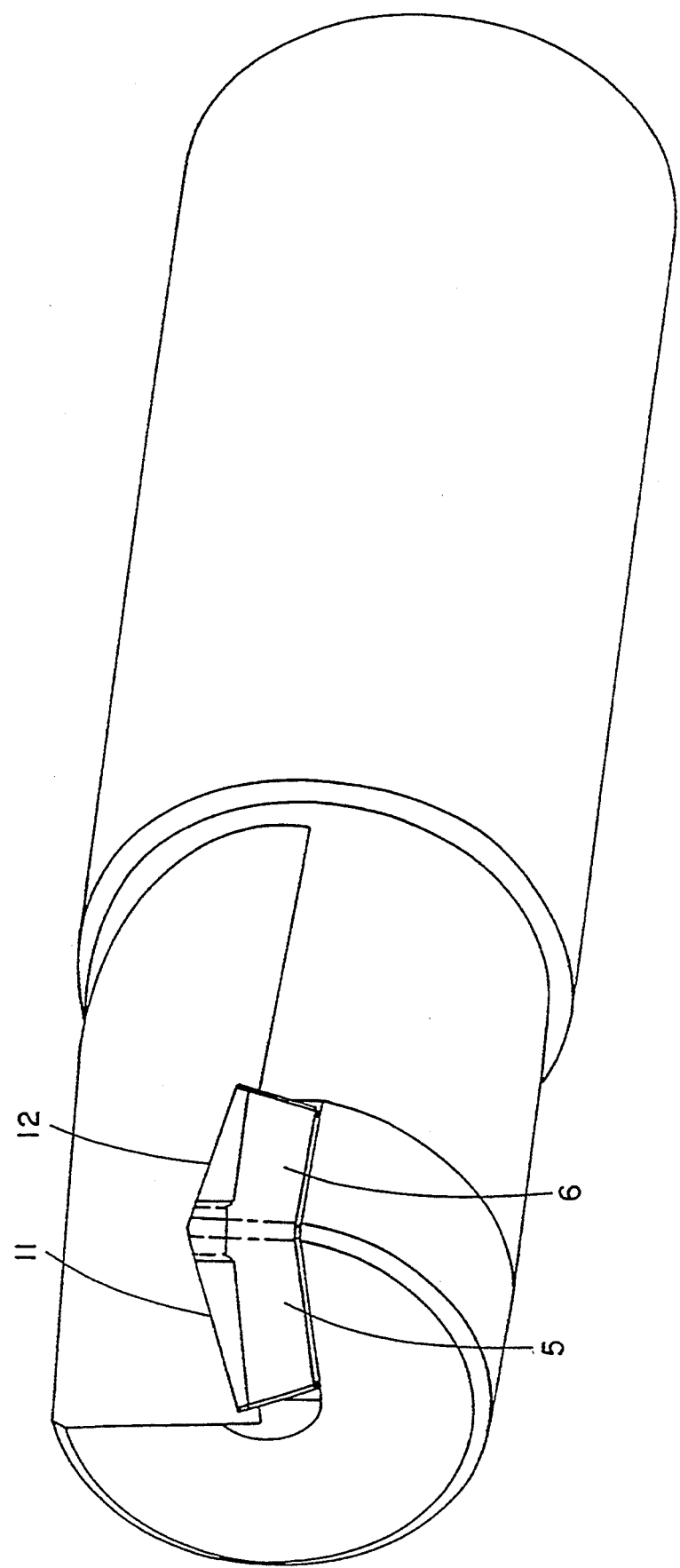
FIG. 4 shows the insert as illustrated in FIGS. 1, 2 and 3 when mounted on a milling cutter tool holder with its operative cutting edge presenting a positive axial rake angle.
Figure 5:
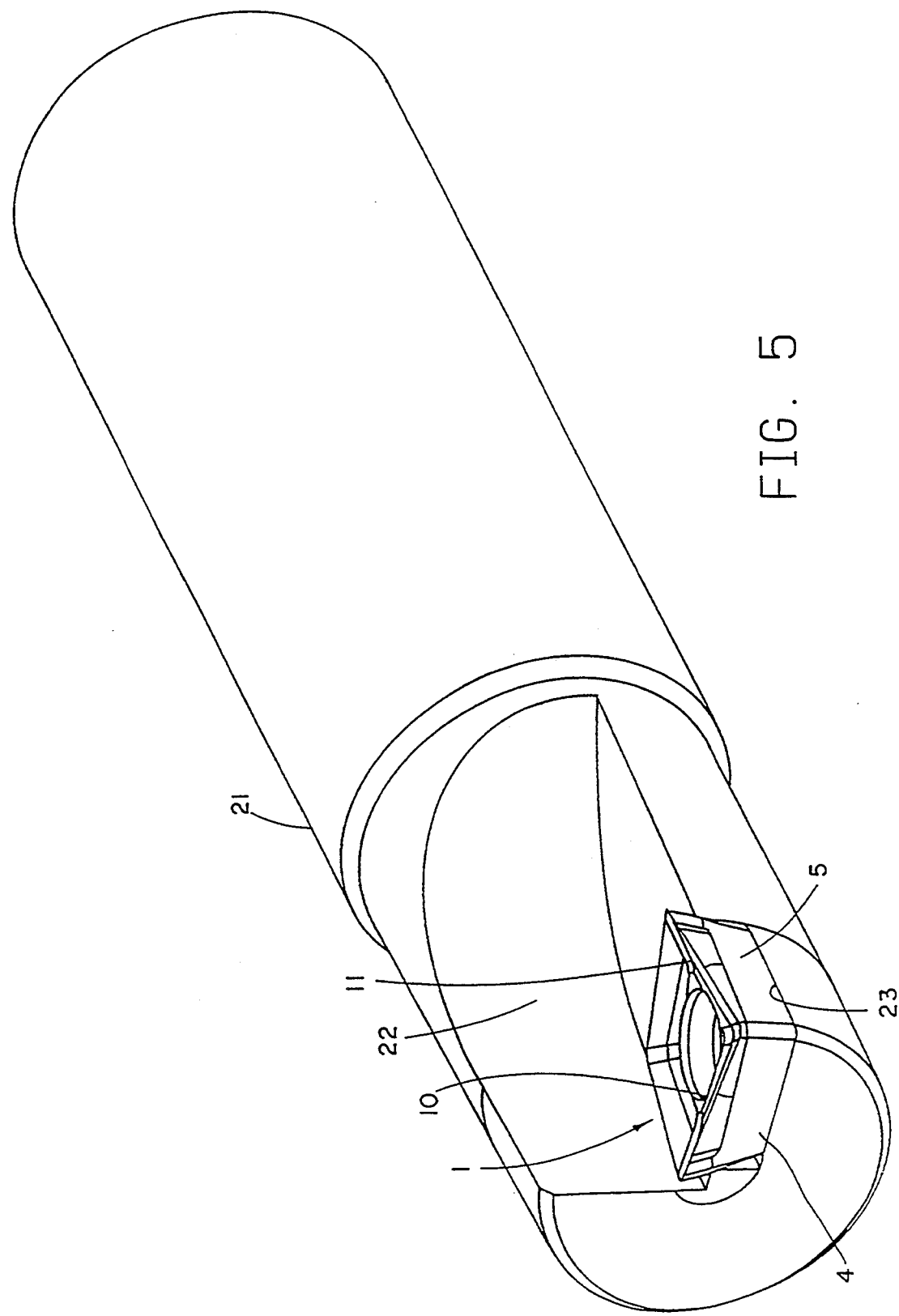
FIG. 5 is a perspective view of the insert shown in FIGS. 1, 2 and 3 when mounted on a milling cutter tool holder with its operative cutting edge presenting a negative axial rake angle.

Reference will now be made to FIGS. 4 and 5 of the drawings, which show how the insert in accordance with the invention can be mounted on a seating of a milling tool holder so that the operative cutting edge presents either a positive or negative axial rake angle, as required.

As seen in FIGS. 4 and 5, a cylindrical milling tool holder 21 is formed with a peripheral recess 22 having an insert seat 23 on which is located an insert 1, as just described with reference to FIGS. 1, 2 and 3. With the insert mounted as shown in FIG. 4 of the drawings, the operative cutting edge is the cutting edge 12 and this cutting edge slopes with respect to the base of the insert and with respect to the rotary axis of the holder so as to define a positive axial rake angle $\gamma_A(+)$. When, however, as seen in FIG. 5 of the drawings, the insert is mounted so that its operative cutting edge is the cutting edge 11, then the latter slopes with respect to the base of the insert and also with respect to the rotary axis of the insert, so as to define a negative axial rake angle $\gamma_A(-)$.

It will thus be readily seen that with inserts of the present invention, one and the same insert can be used so that its operative cutting edge presents either a positive axial rake angle or a negative axial rake angle, as required. Furthermore, it will readily be seen that the same tool holder can be employed, whether the inserts are mounted with positive or with negative axial rake angles.

Whilst in the example described with reference to FIGS. 4 and 5 of the drawings the tool holder is shown with a single milling cutter insert, the invention is equally applicable to milling cutter tools wherein the holder has mounted thereon a plurality of cutting inserts, whether such cutting tools have all inserts mounted so as to present positive or negative axial rake angles, or whether the tool has some inserts presenting positive axial rake angles and others presenting negative axial rake angles.

Figure 6D:
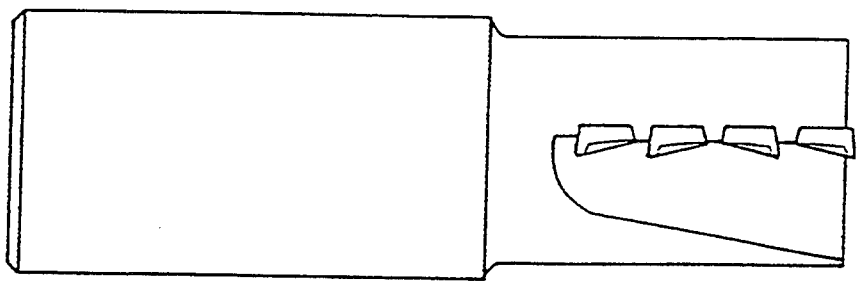
FIGS. 6a–6d are respective schematic side elevations of differing milling cutter tools incorporating inserts in accordance with the present invention.
Figure 6C:
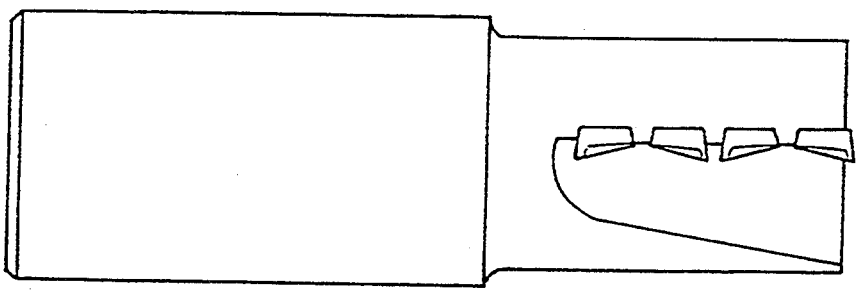
Figure 6B:
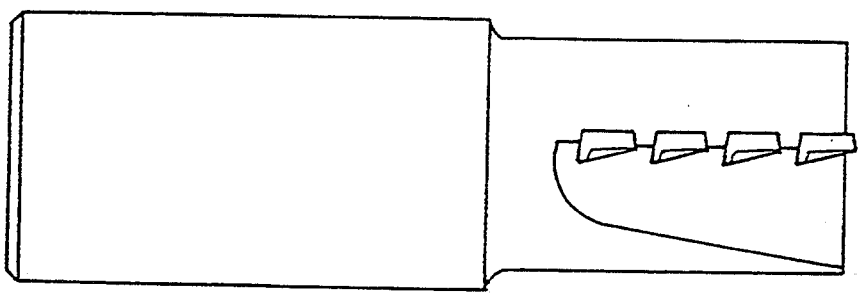
Figure 6A:
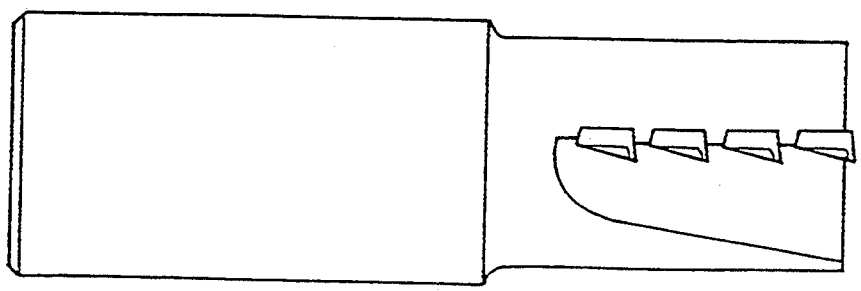

Such cutting tools are shown in FIGS. 6a–6d. Thus, FIG. 6a shows a right hand cut milling cutter tool with a positive axial cut wherein each column of cutting inserts (only one seen) consists of cutting inserts in accordance with the invention whilst FIG. 6b shows a corresponding right hand cut milling cutter tool with a negative axial rake. It will be seen that one and the same tool holder can be used for both types of tools, seeing that all that is necessary to convert one type of tool to the other is simply to reverse the clamping position of the inserts on the tool holder.

FIGS. 6c and 6d, on the other hand, show the use of the inserts in accordance with the invention so that their operative cutting edges are, as in FIG. 6c, "staggered" or, as in FIG. 6d, presenting a "herring bone" pattern.

In all four cases, however, the use of the inserts in accordance with the present invention allows for obtaining tools having a common form of tool holder whereas, in the past, each type of tool would have involved a tool holder with specially designed seatings for the inserts.

Figure 7A:
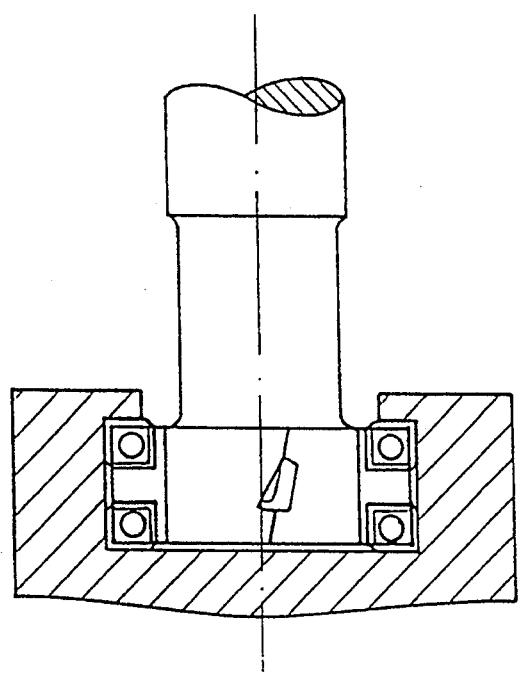
FIGS. 7a & 7b are differing schematic views of a T-slot milling cutter incorporating inserts in accordance with the invention.
Figure 7B:
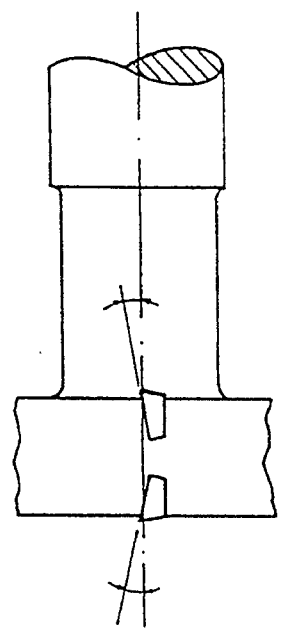

Another example of a milling tool which utilizes the particular unique characteristics of the inserts in accordance with the present invention is a T-slot milling cutter. FIG. 7a is a schematic side elevation of such a tool shown in a workpiece in which a T-slot is being milled. It will be seen that whereas the upper row of inserts are designed to perform a right hand cut, the lower row of inserts is designed to perform a left hand cut. In order, however, to ensure that the operative cutting edges of both the right and left hand cut inserts are axially positive, these edges are dispersed as shown in FIG. 7b of the drawings where, as can be seen, the cutting edges of the inserts slope in opposite directions defining positive axial rake angles $\gamma_A$.

Thus, the use of inserts in accordance with the present invention facilitates their ready incorporation in milling cutter tools whether or right hand or left hand cut, with the operative insert cutting edges being axially positive or negative as required, and all this with tool holders which can be used for all such combinations.

Whilst the invention has been specifically described with inserts whose side surfaces are divided into upper, curved relief flank portions and lower, planar relief flank portions, the invention is equally applicable to inserts whose side surfaces are not so divided.

I claim:

1. A milling cutter insert of substantially prismatic rhomboidal shape comprising upper, base and side surfaces with the intersection of each side surface and the upper surface constituting a cutting edge;

said upper surface being constituted by a central planar portion, parallel to said base surface, and rake surfaces respectively associated with said cutting edges, said rake surfaces sloping towards said central planar portion with which they merge;

a first pair of adjacent cutting edges meeting at a first common insert corner, a second pair of adjacent cutting edges meeting at a second common insert corner diagonally located with respect to said first insert corner, and the constituent cutting edges of each pair and their associated rake surfaces sloping towards the base surface and their common corner; and said first pair of cutting edges and their associated side and rake surfaces constituting a mirror image of said second pair of cutting edges and their associated side and rake surfaces.

2. A milling cutter insert according to claim 1, wherein each side surface is divided into an upper curved relief flank surface and a lower, substantially planar relief flank surface.

3. A milling cutter insert according to claim 2, wherein said rake surfaces are curved, the relief and radial rake angles along the lengths of the cutting edges remaining substantially invariant.

4. A milling cutter insert according to claim 1, wherein each cutting edge is curved, the curvature being such that each cutting edge forms part of the curved side of a plane which intersects a cylinder constituting a surface of revolution of a cutting edge at an angle corresponding to the axial rake angle of the insert in the milling cutter.

5. A milling cutter insert of substantially prismatic rhomboidal shape comprising:

upper, base, and side surfaces wherein each side surface and the upper surface intersect to form a cutting edge;

said upper surface having a central planar portion, parallel to said base surface, and rake surfaces each having an upper edge connected to each said cutting edge and a lower edge merging with said central planar portion, said rake surfaces being curved and sloping towards said central planar portion;

a first pair of cutting edges meeting at a first common corner, a second pair of cutting edges meeting at a second common corner diagonally located with respect to said first insert corner, and the constituent cutting edges of each pair and their associated rake surfaces sloping towards the base surface and their common corner;

each pair of cutting edges including one cutting edge possessing a positive axial rake angle and one cutting edge possessing a negative axial rake angle; and all cutting edges being identical in shape and length to each other.

6. A milling cutter insert of substantially prismatic rhomboidal shape comprising:

upper, base, and side surfaces wherein each side surface and the upper surface intersect to form a cutting edge;

said upper surface having a central planar portion, parallel to said base surface, and rake surfaces each having an upper edge connected to each said cutting edge and a lower edge merging with said central planar portion, said rake surfaces being curved and sloping towards said central planar portion;

said cutting edge on each side of said insert being formed by the intersection of a rake surface and a side surface, wherein the relief and radial rake angles associated with each cutting edge remain substantially invariant along the length of said cutting edge;

a first pair of adjacent cutting edges meeting at a first common insert corner, a second pair of adjacent cutting edges meeting at a second common insert corner diagonally located with respect to said first insert corner, and the constituent cutting edges of each pair and their associated rake surfaces sloping towards the base surface and their common corner;

each pair of adjacent cutting edges including one cutting edge possessing a positive axial rake angle and the other cutting edge possessing a negative axial rake angle; and said insert being rotatably indexable about a centrally located bore to successively position each cutting edge for use.

* * * * *